US008353031B1

(12) United States Patent
Rajan et al.

(10) Patent No.: US 8,353,031 B1
(45) Date of Patent: Jan. 8, 2013

(54) VIRTUAL SECURITY APPLIANCE

(75) Inventors: Archana S. Rajan, Santa Monica, CA (US); Leo Cohen, Tarzana, CA (US); Charlotte W. Chang, Northridge, CA (US); Christopher Alexander, Canoga Park, CA (US); Gary Sabala, Los Angeles, CA (US); Alfred C. Hartmann, Round Rock, TX (US); Wei Lin, Rowland Heights, CA (US); Brendon Woirhaye, Whittier, CA (US)

(73) Assignee: Symantec Corporation, Mountain View, CA (US)

( * ) Notice: Subject to any disclaimer, the term of this patent is extended or adjusted under 35 U.S.C. 154(b) by 1106 days.

(21) Appl. No.: 11/749,970

(22) Filed: May 17, 2007

Related U.S. Application Data

(60) Provisional application No. 60/847,282, filed on Sep. 25, 2006.

(51) Int. Cl.
H04L 29/06 (2006.01)
(52) U.S. Cl. ................... 726/22; 726/23; 726/24
(58) Field of Classification Search .............. 726/22, 726/23, 24
See application file for complete search history.

(56) References Cited

U.S. PATENT DOCUMENTS

| 6,009,475 | A * | 12/1999 | Shrader | 709/249 |
| 6,185,678 | B1 | 2/2001 | Arbaugh et al. | |
| 7,290,145 | B2 * | 10/2007 | Falkenthros | 713/182 |
| 7,362,702 | B2 * | 4/2008 | Terrell et al. | 370/230 |
| 2003/0037089 | A1 * | 2/2003 | Cota-Robles et al. | 709/1 |
| 2003/0226031 | A1 | 12/2003 | Proudler et al. | |
| 2004/0268149 | A1 * | 12/2004 | Aaron | 713/201 |
| 2005/0039047 | A1 * | 2/2005 | Raikar et al. | 713/201 |
| 2005/0108707 | A1 * | 5/2005 | Taylor et al. | 717/177 |
| 2006/0123056 | A1 * | 6/2006 | Darbha et al. | 707/104.1 |
| 2007/0128899 | A1 * | 6/2007 | Mayer | 439/152 |
| 2007/0162749 | A1 * | 7/2007 | Lim | 713/167 |
| 2007/0180509 | A1 * | 8/2007 | Swartz et al. | 726/9 |
| 2007/0192865 | A1 * | 8/2007 | Mackin | 726/24 |
| 2007/0266433 | A1 * | 11/2007 | Moore | 726/15 |

OTHER PUBLICATIONS

U.S. Appl. No. 60/779,127, filed Mar. 2006, Moore, Hezi.*
Arbaugh, W.A., "Trusted Computing," Department of Computer Science, University of Maryland, [online] [Retrieved on Feb. 22, 2007] Retrieved from the Internet<URL:http://www.usenix.org/events/sec05/tech/arbaugh.pdf>.
Archive of Dornan, A., "IT Architect | Intel VT vs. AMD Pacifica | Nov. 1, 2005," www.itarchitecturemag.com, [online] [Archived by http://archive.org on Oct. 25, 2006; Retrieved on Dec. 7, 2007] Retrieved from the Internet<http://web.archive.org/web/20061025201922/http://www.itarchitectmag.com/shared/article/showArticle.jhtml?articleId=172302134>.

(Continued)

Primary Examiner — Edan Orgad
Assistant Examiner — Bradley Holder
(74) Attorney, Agent, or Firm — Fenwick & West LLP

(57) ABSTRACT

Security from malicious attack is provided for a user environment running in a virtualized environment by a virtual security appliance (VSA) running outside of the user environment, but on the same computer system as the user environment. For example, a VSA running in a virtual machine can provide security for a user environment running in a second virtual machine. The separation of the VSA from the user environment enhances the robustness of the VSA against malicious attacks seeking to disable/bypass the protections of the VSA, while avoiding the costs and complexities of a physical security appliance.

11 Claims, 4 Drawing Sheets

OTHER PUBLICATIONS

Cohen, L. et al., "Virtualization—The Next Step in Enterprise Security," Jan. 3, 2007, SC Magazine, US, [online] [Retrieved on Dec. 7, 2007] Retrieved from the Internet<URL:http://www.scmagazineus.com/Virtualization—the-next-step-in-enterprise-security/article/34328/>.

Evers, J., "Intel's VPro to Boost Security," News.com, Apr. 25, 2006, [online] [Retrieved on Dec. 7, 2007] Retrieved from the Internet<URL:http://www.news.com/2102-7355_3-6064609.html?tag=st.util.print>.

"New Client Virtualization Usage Models Using Intel® Virtualization Technology," Intel® Virtualization Technology, Aug. 10, 2006, vol. 10, Issue 03, [online] [Retrieved on Dec. 7, 2007] Retrieved from the Internet<URL:http://www.intel.com/technology/itj/2006/v10i3/4-models/5-client-vm-monitors.htm>.

"Secure Startup—Full Volume Encryption: Technical Overview," Microsoft Corporation, Updated Apr. 25, 2005, [online] [Retrieved on Dec. 7, 2007] Retrieved from the Internet<URL:http://www.microsoft.com/whdc/system/platform/pcdesign/secure-start_tech.mspx>.

"Symantec and Intel Collaborate to Change Security Computing Model," News Release, Apr. 24, 2006, [online] [Retrieved on Dec. 7, 2007] Retrieved from the Internet<URL:http://www.symantec.com/about/news/release/article.jsp?prid=20060424_02>.

"Symantec Virtual Security Solution and PCs with Intel® vPro™ Technology," [online] [Retrieved on Feb. 22, 2007] Retrieved from the Internet<URL:http://www.intel.com/business/casestudies/symantec_solutions_brief.pd>.

"Trusted Computing Group," Dec. 4, 2007, [online] [Retrieved on Dec. 7, 2007] Retrieved from the Internet<URL:http://www.trustedcomputinggroup.org>.

"Xen—Wikipedia, the free encyclopedia," Wikipedia, [online] [Retrieved Feb. 1, 2007] Retrieved from the Internet<URL:http://en.wikipedia.org/wiki/Xen>.

Hendricks, J. et al., "Secure Bootstrap is Not Enough: Shoring Up the Trusted Computing Base," Proceedings of the 11$^{th}$ Workshop on ACM SIGOPS European Workshop, 2004, pp. 1-5.

Itoi, N. et al., "Personal Secure Booting," Lecture Notes in Computer Science, Proceedings of the 6$^{th}$ Australian Conference on Information Security and Privacy, 2001, pp. 130-144, vol. 2119.

* cited by examiner

VIRTUAL SECURITY APPLIANCE

CROSS-REFERENCE TO RELATED APPLICATIONS

This application claims the benefit of Provisional Patent Application Ser. No. 60/847,282, entitled "Virtual Security Appliance and Secure Boot," filed Sep. 25, 2006, and is related to patent application Ser. No. 11/689,397, entitled "Secure Boot Using Stored Hashes and Key," filed Mar. 21, 2007, each of which are incorporated herein in their entirety by reference.

BACKGROUND

1. Field of the Invention

This invention pertains in general to protecting a computer from malicious threats, and in particular to techniques for providing security using a virtual partition running outside of a user operating system.

2. Related Art

Despite the various security mechanisms available today for computers, the number of new attack vectors is growing rapidly. Vulnerabilities of operating systems and applications continue to rise, and current operating systems/client security applications actively are being attacked, largely because they are in the same threat space as the applications and operating systems that they are protecting. In addition, newer threats are able to spread faster than current security software can respond.

There are various ways that threats attack operating systems and applications, including exploiting operating system/application vulnerabilities (e.g., via auto-execution of malware code), modification or deletion of key components (e.g., injection into core operating systems processes), and installation of malicious system drivers. Thus, a typical personal computer (PC) software stack (e.g., BIOS, system drivers, Windows file system, applications) provides for a large attack surface and multiple threat attack points.

Remediation of an infected network of clients can be costly. Last year, companies worldwide spent in the billions of dollars to remedy problems caused by malware, including labor costs and costs associated with loss of productivity.

Current security solutions include security appliances and client security software. Security appliances utilize an isolated execution environment, a locked down software solution stack, and allow only authorized applications to run. However, they consume large amounts of power and space, and have higher costs associated with the use of hardware. Client security software costs less, is easy to use and manage, and is built to secure the PC when enabled. However, security software has a large operating systems attack surface, and the security solution used depends on the operating system/platform it is protecting. In addition, security software is subject to being disabled from the user operating system.

Thus, there is a need for a new paradigm security solution that is tamper resistant, and is always on to protect the end computer robustly and reliably. In addition, prevention of overwrite of the security software, e.g., by writing a new image and rebooting, is desired.

BRIEF SUMMARY OF THE INVENTION

Traditional methods for securing computer systems against malicious software (malware) threats are typically expensive to implement and manage (e.g., security appliances) or present large areas of vulnerability and are susceptible to inappropriate manipulation (e.g., security software). By using virtualization technology to create a virtual security appliance in a computer system that runs in a separate virtual operating environment (e.g., in a separate virtual machine/partition or in a hypervisor) from a user operating system running on the same computer system, a lightweight, efficient, and robust security system (e.g., providing intrusion detection/prevention, firewall capabilities, antivirus tools, antispam tools, parental controls, and/or antiphishing/antipharming protection, among others) can be provided for the user operating system.

The virtual security appliance utilizes hardware or software based virtualization to run in an execution environment that is segregated from a user environment. As a result, a computer system can include a virtual user environment(s) where general computing activity occurs (e.g., a user operating system executing in a virtual machine), and a virtual security appliance that runs outside the user environment(s). The virtual security appliance can communicate with the user environment(s) (e.g., by way of shared resources, such as processor and/or memory) to provide protection from malicious attacks in/on the user environment(s). However, because the virtual security appliance runs outside the user environment, it can be made highly inaccessible to any malicious vectors targeting the user environment(s) (e.g., viruses that would normally disable antivirus software running in the user environment).

In one embodiment, the virtual security appliance can filter network security threats by intercepting network traffic for a user environment, analyzing the network traffic, identifying a security threat, isolating the security threat to yield filtered network traffic, and passing the filtered network traffic to/from the user environment. Towards this end, an embodiment of the virtual security appliance can include a network traffic receiving module for receiving network traffic, a traffic analysis module for analyzing the network traffic, a threat identification module for identifying in the network traffic a security threat, a threat isolation module for isolating the security threat to yield filtered network traffic, and a network traffic transmission module for passing the filtered network traffic between the user environment and the network.

In one embodiment, the startup procedure of the computer system can be configured to make sure that the virtual security appliance (e.g., the service partition in which the virtual security appliance executes) has not been tampered with. For example, using data that is accessible before boot, but cannot be overwritten afterward, hashes of the boot sector and boot loader associated with the virtual security appliance can be stored (optionally with a public key). The actual boot sector/boot loader hashes associated with the virtual security appliance (and corresponding private key, if appropriate) can then be compared to the stored values during startup to determine if any unauthorized changes have been made (prior to continuing the normal boot process). If any such changes are detected, appropriate remedial actions can be taken (e.g., halt boot process, provide user notification, "safe mode" boot, etc.).

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

System Architecture

Figure 1:
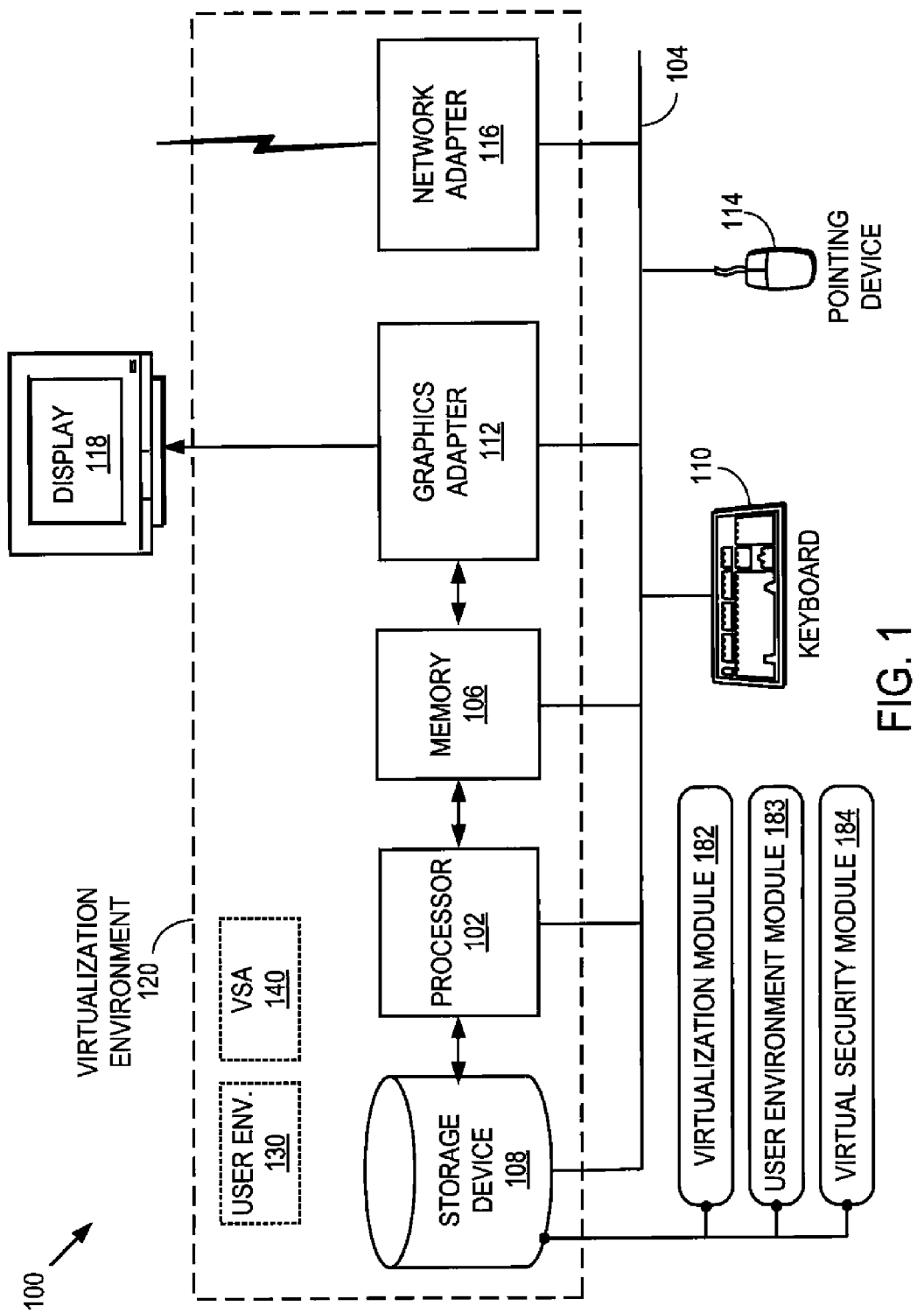
FIG. 1 is a high-level block diagram illustrating a computer system that includes a virtual security appliance.

FIG. 1 is a high-level block diagram of an embodiment of a computer system 100 that runs a virtualized security architecture. Computer system 100 includes at least one processor 102 coupled to a bus 104. Also coupled to the bus 104 are a memory 106, a storage device 108, a keyboard 110, a graphics adapter 112, a pointing device 114, and a network adapter 116 for communicating on a network. A display 118 is coupled to the graphics adapter 112. The storage device 108 is a device (or devices) such as a hard drive, CD or DVD drive, or flash memory device, and holds executable code and/or data utilized during the operation of the computer 100. The memory 106, in one embodiment, is a random access memory (RAM) and holds instructions and data loaded from the storage device 108, generated during processing, and/or from other sources.

Computer system 100 further includes a virtualization module 182, a user environment module 183, and a virtual security module 184. As used herein, the term "module" refers to computer program logic for providing a specified functionality. A module can be implemented in hardware, firmware, and/or software. A module is typically stored on the storage device 108, loaded into the memory 106, and executed by the processor 102. A module can include one or more processes, and/or can provide only part of a process. Note that although modules 182-184 are depicted as discrete modules for explanatory purposes, in various embodiments modules 182-184 may be combined or further divided.

Execution of virtualization module 182 results in a virtualization environment 120 that runs on computer system 100 (e.g., as a virtualization layer running on processor 102, memory 106, and storage device 108). Examples of virtualization technologies include Intel Virtualization Technology (IVT) and AMD Virtualization (AMD-V) for x86 processor architectures. Note that virtualization environment 120 can be either hardware- and/or software-based. For example, in one embodiment, processor 102 can include virtualization technology allowing it to support one or more virtual machines.

Execution of user environment module 183 results in the instantiation of at least one user environment 130 within virtualization environment 120, while execution of virtual security module 184 results in a virtual security appliance (VSA) 140 that also runs on computer system 100. User environment 130 provides an environment in which general user applications can be run, while VSA 140 performs a security function for user environment 130 (i.e., protecting user environment 130 from malicious attack vectors, such as network intrusions, viruses, trojans, spam, and pharming/phishing attacks, among others).

VSA 140 is implemented outside of (i.e., separately from) user environment 130. For example, in one embodiment user environment 130 and VSA 140 can be deployed in separate virtual environments (e.g., in separate virtual machines). Because of this separation between user environment 130 and VSA 140, VSA 140 can provide protection against attack vectors operating on or within user environment 130 while minimizing the ability of such attack vectors to disable/bypass the protections provided by VSA 140. At the same time, because VSA 140 is operating in parallel with user environment 130 within computer system 100, the implementation and management costs and complexity associated with an external security appliance can be avoided.

In one embodiment, VSA 140 can run on a lightweight, thin, embedded service operating system, and can also offer simplified security management of computer system 100 by external administrators that is independent of operating system running within user environment 130. This independence from user environment 130 can allow VSA 140 to self-update with the latest security information without interrupting the operation of user environment 130, thereby ensuring that proactive detection and mitigation of the latest threats can be performed. Similarly, VSA 140 can operate even if user environment 130 is compromised or inactive, thereby allowing external administrators to obtain more accurate troubleshooting information and more quickly restore user environment 130 to a functional state.

Note that computers acting in different roles may have different and/or additional elements than the ones shown in FIG. 1. For example, a computer 100 acting as a server (e.g., with user environment 130 performing server functions) may have greater processing power and a larger storage device than a computer acting as a client. Likewise, a computer 100 acting as a server may lack devices such as a display 118 and/or keyboard 110 that are not necessarily required to operate it. In one embodiment, the computer 100 is an end-point computer, such as a desktop computer, laptop computer, or other personal computing-type device.

Figure 2:
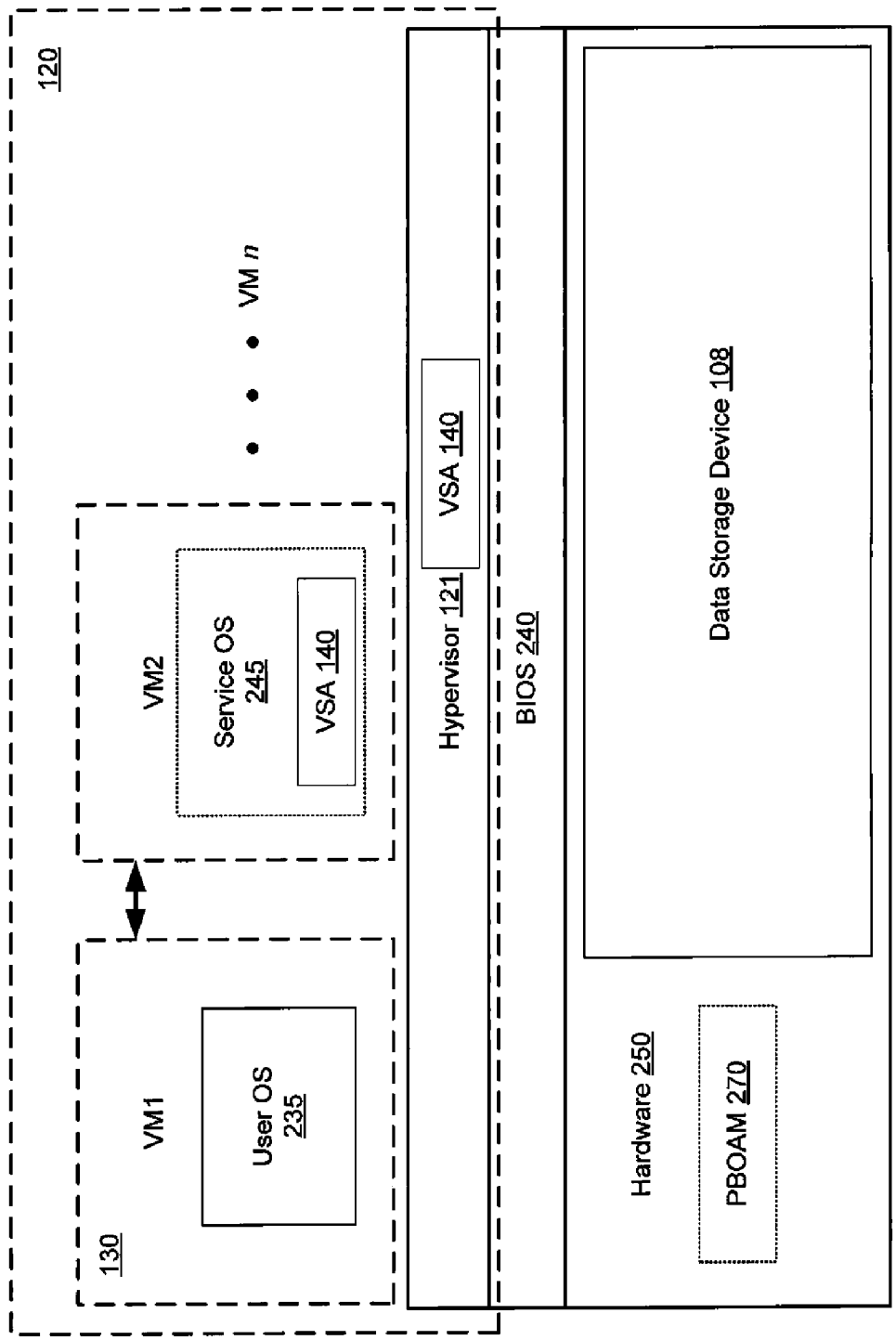
FIG. 2 illustrates a logical view of a virtual computing environment provided by a processor and software according to one embodiment.

FIG. 2 illustrates a logical view of an embodiment of virtualization environment 120. As described above with respect to FIG. 1, virtualization environment 120 includes at least one user environment 130 and at least one virtual security appliance (VSA) 140. User environment 130 may be providing personal computer, server, or any type of computing functionality. In various embodiments, virtualization environment 120 can be implemented on a computer system 100 running a Microsoft operating system, Mac OS, various flavors of Linux, UNIX, Palm OS, and/or other operating systems.

As depicted in FIG. 2, virtualization environment 120 runs on hardware 250 (e.g., processor(s) 102, memories 106, and storage device 108 as described with respect to FIG. 1) and BIOS 240. Virtualization environment 120 can also include an optional hypervisor 121 for managing virtual machines VM1, VM2, . . . VMn. For clarity, the operation of virtualization environment 120 will be described with respect to only virtual machines VM1 and VM2.

The double headed arrow between virtual machines VM1 and VM2 represents an optional inter-partition communication channel. Such an inter-partition communication channel may be included in virtualization environment 120, and can be any communications path between virtual machines VM1 and VM2, such as shared memory, virtual network connection, other socket-based connections, etc. In this example, one or more of virtual machines VM1 and VM2 has a physical network interface to the system hardware 250 (e.g., to a network interface card therein).

Hypervisor (or virtual machine monitor (VMM)) 121, is a software layer that provides the virtualization capability of virtualization environment 120 and manages the operation of virtual machines VM1 and VM2. A hypervisor is a computing scheme that allows multiple operating systems to run, unmodified, at the same time on a computer. In one embodiment, hypervisor 121 has access to the physical network interface of computer system 100 (e.g., network adapter 116 in FIG. 1), and therefore has access to all network communications exiting or entering the computer via that network interface. Hypervisor 121, and modules executing within or under direct supervision of hypervisor 121, can therefore view and optionally alter the network communications. For example, the alterations can include blocking, redirecting, and changing communications.

Hypervisor 121 may be a general-purpose virtual machine monitor (VMM) e.g., VMware's GSX Server or Microsoft's Virtual PC, or may be a lightweight hypervisor supporting only a user operating system and a service operating system, such as Intel's lightweight virtual machine monitor (LVMM). Each virtual machine provides an environment which appears to the user as hardware, but is simulated in a contained software environment within virtualization environment 120. By running multiple operating systems (in multiple virtual machines) simultaneously, hypervisor 121 can provide robustness and stability to the desired functionality provided by computer system 100, such that even if one operating system crashes, the others continue working uninterrupted. In some embodiments, virtualized network interfaces can be created between hypervisor 121 and virtual machines VM1 and VM2.

Each virtual machine provides a virtualized processor, virtualized address space, and virtualized network interface. Software within each individual virtual machine uses the virtualized network interface of that virtual machine to communicate with computers on the Internet and/or other networks. In various other embodiments, certain aspects of the virtual machine are virtualized while others, such as the input/output (I/O) devices, are not.

As described above, user environment 130 is provided by a user OS 235 running in virtual machine VM1. User OS 230 can be any operating system, such as a variant of MICROSOFT WINDOWS or LINUX. In one embodiment, the user operating system 215 is a 64-bit version of WINDOWS VISTA. In general, the user operating system 215 executes one or more application programs and/or services. These programs and services are formed of one or more processes.

In one embodiment, virtual machine VM2 provides an environment in which VSA 140 can operate (e.g., a service OS 245 running within virtual machine VM2 provides an environment in which an application implementing VSA 140 can be executed). According to various embodiments, virtual machine VM2 may support other usage models in addition to VSA 140, including endpoint access control (EAC), client isolation and recovery (CIR), overclocking, embedded IT, and embedded PC health. Because virtual machine VM2 is in a separate partition from virtual machine VM1 (and therefore from user operating system 235), it can be managed separately from virtual machine VM1. In another embodiment, VSA 140 operates in, and is managed by hypervisor 121. In such a configuration, VSA 140 is still segregated, and can be managed separately, from virtual machine VM1.

In one embodiment, remote management and configuration capabilities for virtual machine VM2 can be provided (ideally such that those management/configuration actions cannot be performed via virtual machine VM1). In another embodiment, a web-based user interface to virtual machine VM2 and its affiliated application(s) can be provided, which could then allow for local and/or remote configuration and viewing. Such management approaches can therefore be used without affecting the operation of user environment 130 in virtual machine VM1. In addition, as described in greater detail below, additional security protocols/processes can be incorporated into computer system 100 to ensure that a service operating system 245 of virtual machine VM2 (on which VSA 140 runs) is not compromised by malicious attack vectors attempting to bypass/disable the protection provided by VSA 140.

In some embodiments, the startup procedure of computer system 100 can be configured to ensure that VSA 140 and/or the virtual machine (VM2) in which is resides has not been tampered with. For example, using data storage that is accessible before boot, but that cannot be overwritten afterward (e.g., an optional pre-boot-only accessible memory (PBOAM) 270), hashes of the boot sector and boot loader and a digital key can be stored. The hashes can then be verified and a digital signature on the corresponding operating system image can then be checked to make sure it is authorized, with the computer system booting only if the checks succeed. In one embodiment, a secure boot technique can be used as described in co-owned, co-pending patent application Ser. No. 11/689,397, entitled "Secure Boot Using Stored Hashes and Key," filed Mar. 21, 2007. In another embodiment, conditioning the booting of user OS 235 on the successful activation of VSA 140 can prevent the operation of user environment 130 in a vulnerable mode (e.g., operation while VSA 140 is disabled or compromised).

One skilled in the art will recognize that the virtual computing environment illustrated in FIG. 2 is merely exemplary, and that the embodiments described herein may be practiced and implemented using many other architectures and environments.

Software Architecture

Figure 3:
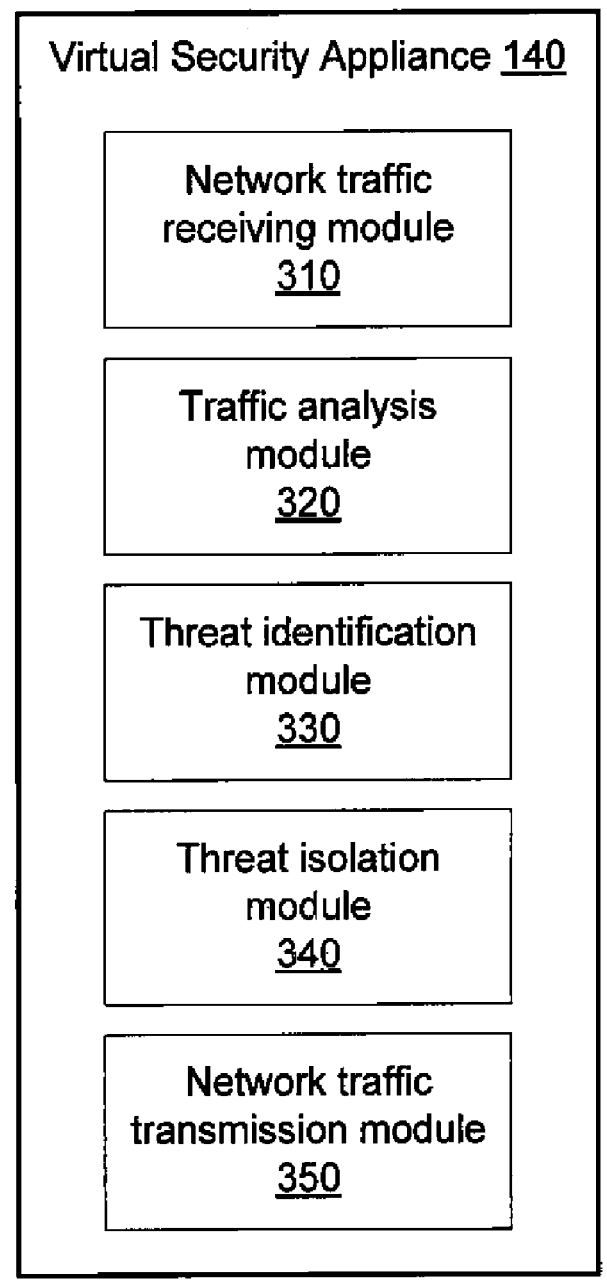
FIG. 3 is a block diagram illustrating a software architecture of a virtual security appliance according to one embodiment.

FIG. 3 is an exemplary block diagram illustrating a software architecture of virtual security appliance 140 configured to provide intrusion detection/prevention for a user environment (e.g., user environment 130), according to an embodiment of the invention.

The virtual security appliance 140 is comprised of a number of executable code portions and data files. The virtual security appliance 140 is responsible for orchestrating the processes performed according to the method of filtering security threats from network traffic as described herein.

The virtual security appliance 140 includes a network traffic receiving module 310, a traffic analysis module 320, a threat identification module 330, a threat isolation module 340, and a network traffic transmission module 350 according to one embodiment.

The network traffic receiving module 310 enables the computer system 100 to intercept the network traffic of the user environment (e.g., user environment 130). This network traffic can be the network traffic to and/or from an external network. The network traffic is received at a location of the end-point computer outside of the user partition virtual machine.

The traffic analysis module 320 enables the computer system 100 to analyze the network traffic between the user partition virtual machine and the network according to one embodiment.

The threat identification module 330 enables the computer system 100 to identify security threats within the analyzed network traffic according to one embodiment.

The threat isolation module 340 enables the computer system 100 to isolate security threats identified within the analyzed network traffic to yield filtered network traffic according to one embodiment.

The network traffic transmission module 350 enables the computer system 100 to pass the filtered network traffic between the user partition virtual machine and the network according to one embodiment.

The above software portions 310-350 need not be discrete software modules. The software configuration shown is meant only by way of example; other configurations are contemplated by and within the scope of the disclosed embodiments.

The virtual security appliance 140 may be provided to computer system 100 on a computer readable media, or by electronic communication over a network, from a distributor of software, e.g., for installation and execution thereon (see FIG. 1, large arrow). Alternatively, the virtual security appliance 140 can be hosted on a server computer, and accessed over a network by the user, using for example a browser interface to the virtual security appliance 140. Alternatively, the virtual security appliance 140 and/or other associated applications may be embedded on computer system 100 prior to purchase.

The virtual security appliance 140 may include additional modules, e.g., for supporting a method of enabling a secure boot sequence as described above with respect to FIG. 2.

Process Flow

Figure 4:
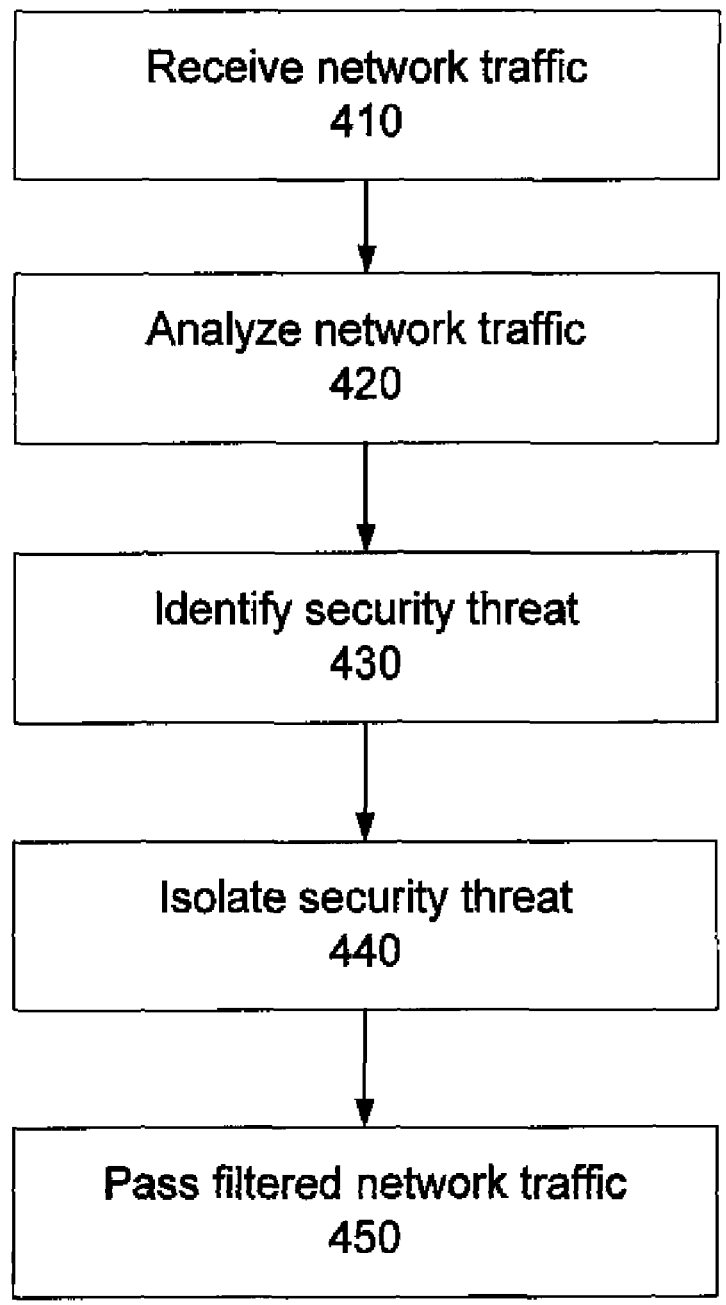
FIG. 4 is a flowchart showing a method of filtering security threats from network traffic on an end-point computer according to one embodiment.

FIG. 4 is a flowchart showing a method of filtering security threats from network traffic on an end-point computer according to one embodiment. Other embodiments perform different and/or additional steps than the ones described here. Moreover, other embodiments perform the steps in different orders. Since a typical computer system 100 is simultaneously engaged in multiple network communication sessions, some embodiments may perform multiple instances of the steps of FIG. 4 concurrently.

The method of filtering security threats from network traffic is performed on an end-point computer having a user partition virtual machine controlled by a hypervisor. The method begins with receiving 410 network traffic between the user partition virtual machine and a network. The network traffic is received 410 at a location of the end-point computer outside of the user partition virtual machine. Both inbound and outbound network traffic may be received. Various such locations are possible according to various embodiments, as discussed in greater detail below.

Next, the network traffic between the user partition virtual machine and the network is analyzed 420. The network traffic is received 410 and analyzed 420 by a virtual security appliance, e.g., VSA 140, according to one embodiment. The virtual security appliance may be booted prior to boot of an operating system running on the user partition virtual machine.

The virtual security appliance may execute in a services partition virtual machine controlled by the hypervisor, alternatively the virtual security appliance may execute in the hypervisor itself. The sole requirement is that the network traffic is received 410 and analyzed 420 at a location of the end-point computer outside of the user partition virtual machine.

Next, security threats are identified 430 within the analyzed network traffic and are isolated 440 to yield filtered network traffic. Security threats may include viruses, worms, user installation of malware, exploitation of operating system or application vulnerabilities (e.g., via auto-execution of malware code), modification or deletion of key components (e.g., injection into core operating system processes), and installation of malicious system drivers.

For inbound threats, this step includes identifying 430 and isolating 440 threats before they reach the user operating system. For outbound threats, or threats originating at the user operating system, the isolating 440 may include isolating infected systems to protect the network. Once threats are isolated 440, the filtered (clean) network traffic is then passed 450 between the user partition virtual machine and the network.

The above has been described in particular detail with respect to one possible embodiment. Those of skill in the art will appreciate that the above described systems and methods may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The disclosed systems and methods also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the content disclosed herein is not described with reference to any particular programming language. It is appreciated that a variety of programming languages may be used to implement the teachings of the disclosure as described herein, and any references to specific languages are provided for enablement and best mode.

The content disclosed is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

We claim:

1. A computer system comprising:
   a computer processor; and
   a computer-readable storage medium storing computer program instructions, the computer program instructions when executed by the computer processor perform steps comprising:
   enabling a virtualization environment to be run on the computer system;
   verifying that a security environment within the virtualization environment and a virtual security appliance within the security environment have not been tampered with, the virtual security appliance within a service operating system that executes in a security virtual machine of the security environment;
   and
   running the virtual security appliance in the security environment responsive to the verification;
   generating a user environment within the virtualization environment that is segregated from the security environment, the user environment comprising a user operating system that executes in a user virtual machine within the user environment, the user environment adapted to execute a user application within the user environment and execute the user operating system within the user environment responsive to the virtual security appliance running in the security environment; and
   using the virtual security appliance to:
   intercept network traffic directed to the user application in the user environment;
   analyze the intercepted network traffic;
   identify a security threat in the intercepted network traffic;
   isolate the security threat from the intercepted network traffic to yield filtered network traffic; and
   transmit the filtered network traffic to the user application in the user environment.

2. The computer system of claim 1, wherein the virtual security appliance further provides a security function comprising at least one of network intrusion detection, network intrusion prevention, virus protection, trojan protection, phishing prevention, and pharming prevention.

3. The computer system of claim 1, wherein the security virtual machine is remotely accessible, but is not accessible by the user operating system.

4. The computer system of claim 1, wherein the computer system further comprises a hypervisor.

5. The computer system of claim 1, wherein the intercepted network traffic comprises inbound network traffic intended for the user environment.

6. The computer system of claim 1, wherein the intercepted network traffic comprises outbound network traffic intended for a network; and
   wherein the computer program instructions when executed by the computer processor perform further steps comprising isolating the user environment from communications with the network if the security threat originated from within the user environment.

7. A method for operating a computer system, the method comprising:
   operating a virtualization environment on the computer system;
   verifying that a security environment within the virtualization environment and a virtual security appliance in the security environment have not been tampered with;
   operating the virtual security appliance within a service operating system that executes in a security virtual machine of the security environment responsive to the verification;
   operating a user environment that is segregated from the security environment within the virtualization environment, the user environment comprising a user operating system that executes in a user virtual machine within the user environment and wherein the user environment is adapted to execute a user application and the user operating system within the user environment responsive to the operation of the virtual security appliance in the security environment; and
   using the virtual security appliance to:
   intercept network traffic directed to the user application in the user environment;
   analyze the intercepted network traffic;
   identify a security threat in the intercepted network traffic;
   isolate the security threat from the intercepted network traffic to yield filtered network traffic; and
   transmit the filtered network traffic to the user application in the user environment.

8. The method of claim 7, further comprising performing a security function comprising at least one of network intrusion detection, network intrusion prevention, virus protection, trojan protection, phishing prevention, and pharming prevention.

9. The method of claim 7, wherein the virtualization environment comprises a hypervisor, and
   wherein the virtual security appliance is operated in the hypervisor.

10. A non-transitory computer readable storage medium having computer program instructions for a computer system, the computer program instructions when executed performing steps comprising:

operating a virtualization environment on the computer system;

verifying that a security environment within the virtualization environment and a virtual security appliance in the security environment have not been tampered with;

operating the virtual security appliance within a service operating system that executes in a security virtual machine of the security environment responsive to the verification;

operating a user environment that is segregated from the security environment within the virtualization environment, the user environment comprising a user operating system that executes in a user virtual machine within the user environment and wherein the user environment is adapted to execute a user application and the user operating system within the user environment responsive to the operation of the virtual security appliance in the security environment; and using the virtual security appliance to:
intercept network traffic directed to the user application in the user environment;
analyze the intercepted network traffic;
identify a security threat in the intercepted network traffic;
isolate the security threat from the intercepted network traffic to yield filtered network traffic; and
transmit the filtered network traffic to the user application in the user environment.

11. The non-transitory computer readable storage medium of claim 10, further comprising performing a security function comprising at least one of network intrusion detection, network intrusion prevention, virus protection, trojan protection, phishing prevention, and pharming prevention.

* * * * *